(12) United States Patent
Gao

(10) Patent No.: US 10,279,765 B2
(45) Date of Patent: May 7, 2019

(54) SAFE PROTECTION EQUIPMENT FOR ALL VEHICLES AND DRIVERS FROM BOTH FRONT AND REAR

(71) Applicant: Qiusheng Gao, Wujiang (CN)

(72) Inventor: Qiusheng Gao, Wujiang (CN)

( * ) Notice: Subject to any disclaimer, the term of this patent is extended or adjusted under 35 U.S.C. 154(b) by 0 days.

(21) Appl. No.: 15/451,357

(22) Filed: Mar. 6, 2017

(65) Prior Publication Data

US 2018/0251089 A1    Sep. 6, 2018

(51) Int. Cl.
| | |
|---|---|
| *B60R 19/26* | (2006.01) |
| *B60R 19/28* | (2006.01) |
| *B60R 19/32* | (2006.01) |
| *B60R 19/36* | (2006.01) |
| *B60R 19/02* | (2006.01) |
| *B60R 19/38* | (2006.01) |
| *F16F 3/02* | (2006.01) |
| *F16F 9/34* | (2006.01) |
| *F16F 13/00* | (2006.01) |
| *B60T 7/22* | (2006.01) |

(52) U.S. Cl.
CPC ............ *B60R 19/36* (2013.01); *B60R 19/023* (2013.01); *B60R 19/26* (2013.01); *B60R 19/28* (2013.01); *B60R 19/32* (2013.01); *B60R 19/38* (2013.01); *F16F 3/02* (2013.01); *F16F 9/34* (2013.01); *F16F 13/007* (2013.01); *B60R 2019/262* (2013.01); *B60T 7/22* (2013.01)

(58) Field of Classification Search
CPC ......... B60R 19/26; B60R 19/28; B60R 19/32; B60R 19/36; B60T 7/22

USPC .......... 296/187.03, 187.06, 187.09; 293/8, 9, 293/107, 129, 132, 134

See application file for complete search history.

(56) References Cited

U.S. PATENT DOCUMENTS

| | | | | |
|---|---|---|---|---|
| 1,600,465 | A | * | 9/1926 | Gentiloni ................ B60R 19/02 180/275 |
| 2,142,328 | A | * | 1/1939 | Mutter .................... B60R 19/02 180/275 |
| 2,843,224 | A | * | 7/1958 | Landman ................ B60R 19/02 180/276 |
| 2,959,251 | A | * | 11/1960 | Landman ................ B60R 19/02 180/276 |
| 3,659,835 | A | * | 5/1972 | Peterson ................. F16F 9/303 188/371 |
| 5,593,195 | A | * | 1/1997 | Lei .......................... B60R 19/02 293/134 |
| 5,971,451 | A | * | 10/1999 | Huang .................... B60R 19/18 293/102 |

(Continued)

*Primary Examiner* — Gregory A Blankenship

(57) ABSTRACT

Safe protection equipment for all vehicles will significantly reduce the collision force by spring or liquid cylinder when the vehicle bumps to obstacle or two vehicles collide with each other. This equipment can be used on both front and rear of the vehicle. Combination of springs or liquid cylinder with different elasticity can reduce the collision smoothly. This equipment will protect both vehicles and drivers without changing the current air-bag protection system. It will significantly reduce the damage for serious collision accidents.

This equipment is attached to the vehicle chassis with a pair of pad to pass the reduced collision force to the elastic tire when colliding vehicles are running in straight line. Normally vehicle running in straight line has high speed and the collision force is strong. The elastic tire can reduce the collision force further.

6 Claims, 1 Drawing Sheet

(56) References Cited

U.S. PATENT DOCUMENTS

| | | | | |
|---|---|---|---|---|
| 6,050,624 A * | 4/2000 | Kim | ........................ | B60R 19/28 |
| | | | | 293/132 |
| 6,217,090 B1 * | 4/2001 | Berzinji | .................. | B60R 19/28 |
| | | | | 293/106 |
| 6,302,458 B1 * | 10/2001 | Wang | ...................... | B60R 19/40 |
| | | | | 293/119 |
| 6,626,474 B1 * | 9/2003 | Ameur | .................... | B60R 19/40 |
| | | | | 293/107 |
| 8,544,589 B1 * | 10/2013 | Rupp | .................. | B62D 21/152 |
| | | | | 180/274 |
| 8,544,905 B2 * | 10/2013 | Handing | ................. | B60R 19/34 |
| | | | | 293/118 |
| 2005/0104391 A1 * | 5/2005 | Browne | .................. | B60R 19/03 |
| | | | | 293/132 |
| 2008/0238115 A1 * | 10/2008 | Chong | .................... | B60R 19/00 |
| | | | | 293/132 |
| 2009/0309101 A1 * | 12/2009 | Kim | .................. | G02F 1/136213 |
| | | | | 257/59 |
| 2010/0109356 A1 * | 5/2010 | Shoap | .................... | B60R 19/26 |
| | | | | 293/132 |

\* cited by examiner

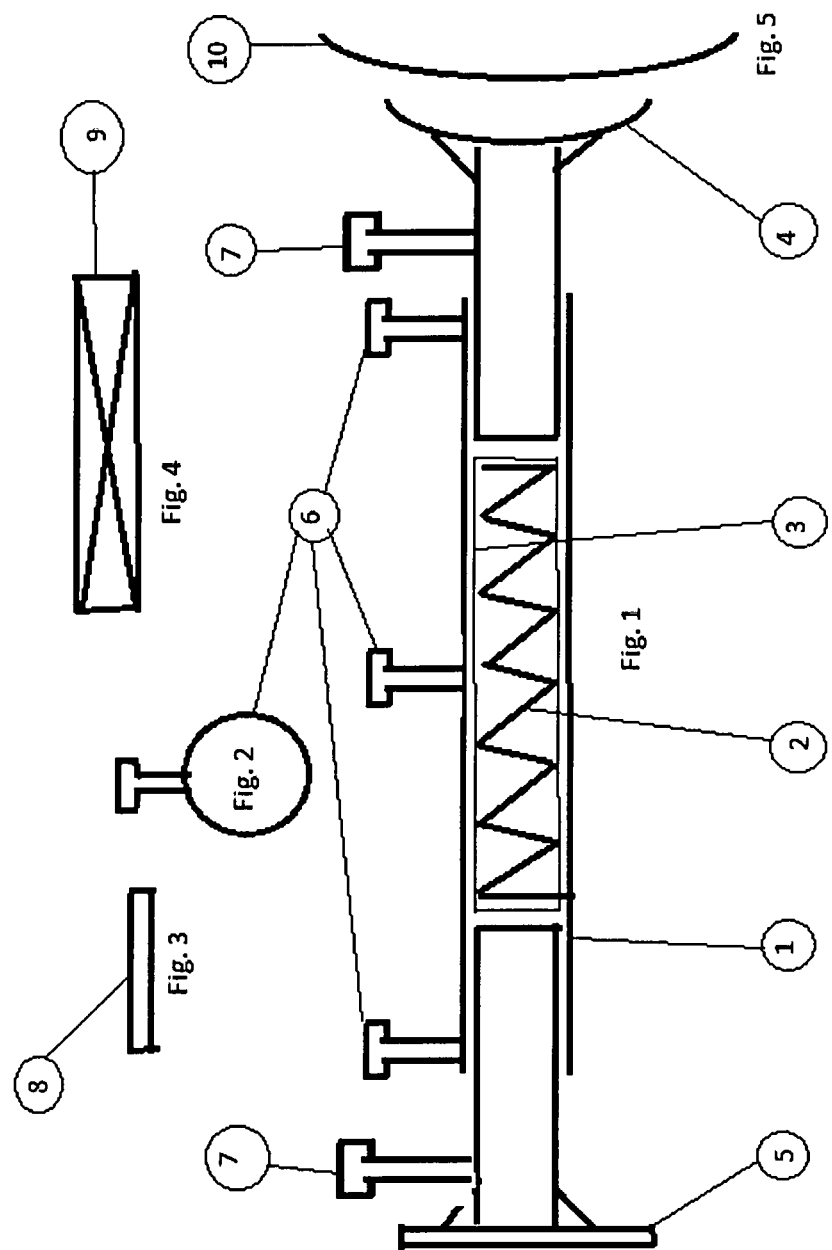

SAFE PROTECTION EQUIPMENT FOR ALL VEHICLES AND DRIVERS FROM BOTH FRONT AND REAR

TECHNICAL FIELD

The present invention generally relates to improvements in protecting both vehicles and drivers utilizing the elasticity of spring and/or liquid cylinder from either front and/or rear over collision accidents. The spring or liquid cylinder will be compressed to reduce the colliding force when the vehicle hits an obstacle or collides with each other. The reduced colliding force will be passed to the chassis of the vehicle. The tire elasticity also can be used to reduce the colliding force if the vehicle is running in straight line or almost straight line.

There is no change for the current airbag protection system.

BACKGROUND ART

Currently, most vehicles use airbag to protect the drivers in collision accidents. There is limitation with airbag protection. Airbag only protects driver, but not vehicle. When the vehicle hits an obstacle or collide with each other, the body and auto parts can be damaged. In case of heavy collision accident, not only the vehicles are seriously damaged, but also the drivers could be seriously injured or even killed due to the strong colliding force. In case the collision is not heavy, the vehicle body or auto parts still could be damaged.

SUMMARY OF THE INVENTION

An object of the present invention is to utilize the elasticity of spring or liquid cylinder or tire to reduce the colliding force and pass the reduced colliding force to the chassis or tire to protect the vehicle and improve the protection over drivers. The current airbag protection system is not changed. Overall it will significantly reduce the damage for both vehicles and drivers in the collision accidents.

In accordance with the present invention, there is a tube with one or multiple springs or liquid cylinders inside. The tube is fixed to the chassis of the vehicle. On one end of the tube, a movable cylinder is put inside the tube. This cylinder is fixed to the front bump, which is changed as a movable part from the current fixed part. To make the front bump movable, one choice is to hang the cylinder fixed to the bump to the vehicle chassis with sliding rails. On another end of the tube, another movable cylinder is also put inside the tube. This movable cylinder has a pad on another end. The pad is near the tire. The movable cylinder is hang to the sliding rails attached to the chassis. A pair of tubes is installed on left and right of the vehicles, each one parallel to the tire. A bar (optional) is used to connect two cylinder pads.

In accordance with the present invention, when the vehicle hits an obstacle or collide with another vehicle, the cylinder fixed to the bump will push the spring or liquid cylinder, which will push another movable cylinder with the pad to the tire, if the vehicle is running almost in straight line. During this process, the spring or liquid cylinder will reduce the colliding force by compression. The elasticity of the tire also can reduce the colliding force. If the vehicle is turning left or right with big angle, the movable cylinder will be stopped in a fixed position by a stopper in the sliding rails and the pad will not hit the tire, but the spring or liquid cylinder inside the tube will still compress to reduce the colliding force. The second cylinder will pass the reduced colliding force to the chassis. In this case, normally the vehicle is in low speed so there is no problem even the pad does not hit the tire. If the collision is not heavy, there should be no any damage to both vehicle and driver. If the collision is heavy, it might cause the vehicle turning back. It might trigger the vehicle to pop up the airbag. In any case, it will significantly reduce the damage to the vehicle and driver.

In accordance with the present invention, this equipment can be installed on both front and rear of the vehicle with similar design architecture. The vehicle might need to change the chassis and frame design to attach the equipment properly.

In accordance with the present invention, the tube can contain single or multiple springs or liquid cylinders with different elasticity, or combination of springs and liquid cylinders. The combination of springs or liquid cylinders with different elasticity will reduce the colliding force smoothly with the spring or liquid cylinder of soft elasticity being compressed first.

BRIEF DESCRIPTION OF THE DRAWINGS

FIG. 1 provides the primary horizontal view from the left side of the vehicle. There are no other views since the equipment is simply composed of tubes or bars while the size needs further experiment based on the size and type of vehicle.

FIG. 2 provides the cross section view of the component 6 that fixes the tube to the chassis.

FIG. 3 provides side view of the component 8, sliding rails hanging to the vehicle.

FIG. 4 provides front view of component 9, steel plate or bars that connect 2 spring equipment together near the tire.

FIG. 5 provides side view of the tire, component 10.

DETAILED DESCRIPTION OF PREFERRED EMBODIMENTS

This equipment can be applied to all type of vehicles, e.g., cars, vans and trucks. The material can be steel or composites. The size of equipment or the elasticity of the spring (2) or liquid cylinder (3) needs further experiment based on the vehicle. A pair of tubes (1) is installed to the chassis in left and right of the vehicle symmetrically. The bump (5) can be designed in different ways such as plate or combination of tube. The chassis and frame of the vehicle need some strength enhancement. In case of combination of springs (2) or liquid cylinders (3), the spring (2) or liquid cylinder (3) with soft elasticity should be compressed first.

When the vehicle hit an obstacle or two vehicles collide with each other, the bump (5) will push the spring (2) or liquid cylinder (3) through the movable cylinder fixed to the bump (5). The spring (2) or the liquid cylinder (3) will push the cylinder with the brake pad (4). If the vehicle is running in straight line or almost straight line, the brake pad (4) will hit the tire (10). During this process, the spring (2) or liquid cylinder (3) inside the tube (1) will be compressed to reduce the colliding force. The elasticity of the tire (10) will also reduce the colliding force. If the vehicle is turning left or right with big angle, the brake pad (4) will not hit the tire (10) and the cylinder with the brake pad (4) will be stopped in a position by a stopper in the sliding rails and the reduced colliding force will be passed to the chassis. If the colliding is very heavy, it will also trigger the vehicle to pop up the airbag. In any case, the damage to the vehicle and the driver will be reduced significantly.

The invention claimed is:

1. A tube with spring or liquid cylinder comprising:
a tube (1)
a part (6) fixing the tube to a chassis
single or multiple springs (2) or liquid cylinders (3) or combination of springs (2) and liquid cylinders (3)
2 movable cylinders inside the tube with one in one end and another cylinder in other end of the tube for moving forth and back, one cylinder fixed to a bumper and another cylinder has a brake pad (4) on one end, both are hung to sliding rails fixed to the chassis, the sliding rails have a stopper to prevent the bumper move outside and another stopper to stop another cylinder if the brake pad (4) does not hit a tire (10) when a vehicle is turning left or right in big angle
characterized in that a colliding force hitting on the bumper moves the cylinder fixed to the bumper forward and push the spring (2) or liquid cylinder (3) that push another cylinder on another end moving towards the tire (10) until the brake pad (4) hits the tire then the spring (2) or liquid cylinder (3) will be compressed to reduce the colliding force that is passed to the tire hence significantly reduce the damage to a body of the vehicle and passengers inside the vehicle in that the colliding force hitting on the bumper is passed to the body of a vehicle without reduction in an airbag protection system.

2. The tube as claimed in claim 1 characterized in that the combination of springs (2) or liquid cylinders (3) has different values of elastic coefficient, with one having a low value of elastic coefficient, to reduce the colliding force smoothly with the spring or liquid cylinder of low value of elastic coefficient being compressed first and can reduce the injury to a person who is hit by the vehicle.

3. The tube as claimed in claim 1 characterized in that a tire (10) having elasticity will reduce the colliding force if the brake pad (4) hits the tire (10) when the vehicle is running in straight line or almost straight line.

4. The tube as claimed in claim 1 characterized in that it passes the reduced colliding force to the chassis of the vehicle through the stopper in the sliding rails when the vehicle turns left or right with big angle and the brake pad will not hit the tire.

5. The tube as claimed in claim 1 characterized in that the tube can be applied to one of a car, van and truck.

6. The tube as claimed in claim 1 characterized in that the tube can be applied to a front and/or rear of the vehicle.

* * * * *